US006119569A

United States Patent [19]

Benedict et al.

[11] Patent Number: 6,119,569

[45] **Date of Patent: *Sep. 19, 2000**

[54] SAFETY GUARD STOP FOR POWER SAWS

[75] Inventors: Charles E. Benedict, Tallahassee, Fla.; Douglas A. Newcomer, Commerce; Gregory W. Hatcher, Cairo, both of Ga.; Timothy M. Cheek; Douglas R. Stahl, both of Tallahassee, Fla.

[73] Assignee: Benedict Engineering Company, Tallahassee, Fla.

[ * ] Notice: This patent issued on a continued prosecution application filed under 37 CFR 1.53(d), and is subject to the twenty year patent term provisions of 35 U.S.C. 154(a)(2).

[21] Appl. No.: 08/885,802

[22] Filed: Jun. 30, 1997

Related U.S. Application Data

[60] Provisional application No. 60/020,919, Jul. 1, 1996.

[51] Int. Cl.$^{7}$ .................... B23D 45/04; B27G 19/04

[52] U.S. Cl. .................... 83/478; 83/397; 83/DIG. 1

[58] Field of Search .................... 83/478, 397, DIG. 1, 83/490, 544; 30/390, 391

[56] References Cited

U.S. PATENT DOCUMENTS

| | | | |
|---|---|---|---|
| 1,481,569 | 1/1924 | Tannewitz | 83/471.3 |
| 4,318,324 | 3/1982 | Hall et al. | 83/490 X |
| 4,343,213 | 8/1982 | Drixler | 83/481 X |
| 4,581,966 | 4/1986 | Kaiser et al. | 83/490 X |
| 4,805,504 | 2/1989 | Fushiya et al. | 83/397 |
| 5,075,976 | 12/1991 | Young | 30/391 |
| 5,129,300 | 7/1992 | Kawakami | 83/471.2 |
| 5,184,534 | 2/1993 | Lee | 83/397 |
| 5,370,025 | 12/1994 | Itzov | 83/478 X |
| 5,752,421 | 5/1998 | Chang | 83/490 X |

FOREIGN PATENT DOCUMENTS

| | | | |
|---|---|---|---|
| 48212 | 12/1982 | Germany | 83/397 |
| 631535 | 8/1982 | Switzerland . | |

*Primary Examiner*—Rinaldi I. Rada
*Assistant Examiner*—Boyer Ashley
*Attorney, Agent, or Firm*—Dowell & Dowell, P.C.

[57] ABSTRACT

A safety device for a power saw, such as a miter saw, includes an interference stop mounted on the frame or other support of the saw. The stop prevents a lower pivotal blade guard of the saw from being pushed away from a covering relationship with respect to the saw blade when the saw is moved from a "cutting" position to a fully raised "home" position, thereby preventing accidental exposure of the saw blade.

8 Claims, 2 Drawing Sheets

SAFETY GUARD STOP FOR POWER SAWS

CROSS REFERENCE TO RELATED APPLICATION

This application is related to U.S. Provisional Application Serial No. 60/020,919 filed Jul. 1, 1996.

BACKGROUND OF THE INVENTION

1. Field of the Invention

This invention relates to power saws, and more particularly, to a safety device for a miter or other pivotally moveable saw which provides increased protection against accidents while the saw is in a fully retracted or raised position.

2. History of the Related Art

Conventional miter saws and related vertically pivoted saws are generally equipped with retractable blade guards which provide limited protection in covering cutting blades when the saws are moved to and from cutting positions with respect to workpieces. The guards are mounted so as to be raised or pivoted to expose the blades as the guards contact workpieces. Unfortunately, such guards remain pivotable relative to the saw blades even when raised to a "home" or "rest" position wherein the guards extend outwardly beyond the blades. Contact with these types of retractable guards when in the "home" position, including accidental contact, exposes the blades, which may be rotating while in the retracted or "home" position, thus potentially causing serious injury to individuals. A suitable means for preventing the possible occurrence of such accidents would be extremely beneficial.

Some examples of prior art for safety devices for miter type saws are disclosed in U.S. Pat. No. 1,481,569 to Tannewitz and U.S. Pat. No. 5,184,534 to Lee as well as Swiss Patent 631,535.

SUMMARY OF THE INVENTION

The present invention is directed to an improvement for a miter or similar rotating saw which includes a motor and cutting blade which are mounted to a housing in which the upper portion of the cutting blade rotates. The housing is supported from a support arm relative to a table or other cutting surface so that the housing and cutting blade may be lowered from a raised "home" position to a lower cutting position relative to a workpiece. A lower blade guard is pivotally mounted to the housing so as to extend on opposite sides of the portion of the cutting blade which is exposed below the housing. In the preferred embodiment, the lower blade guard is pivoted to the forward portion of the housing. A guide pin and slot assembly are provided for guiding the lower blade guard in its pivotal movement relative to the housing.

A lower blade guard stop is mounted adjacent to the support arm for the housing and includes a forward end portion which is engageable with a rear wall of the pivotable lower blade guard whenever the housing and cutting blade are raised to the "home" position. With this relationship, the blade guard stop prevents the upward pivotal movement of the lower blade guard and thus prevents accidental exposure of the cutting blade whenever the cutting blade is in a raised position.

It is the primary object of the present invention to provide a stop member which prevents a pivotable lower blade guard associated with a miter or similar saw from being accidentally pivoted away from a covering relationship with the cutting blade of the saw when the saw is in a fully raised or retracted "home" position.

It is yet a further object of the present invention to provide a device for positively blocking the movement of a moveable lower saw blade guard associated with a miter or similar type saw so as to prevent accidental exposure of the cutting blade and thus prevent accidental injury to the saw operator.

BRIEF DESCRIPTION OF THE DRAWINGS

The above and other objects and advantages of the present invention will be readily apparent from the following detailed description of the preferred embodiments, particularly when read in conjunction with the accompanying drawing figures, in which.

DESCRIPTION OF THE PREFERRED EMBODIMENT

Figure 1:
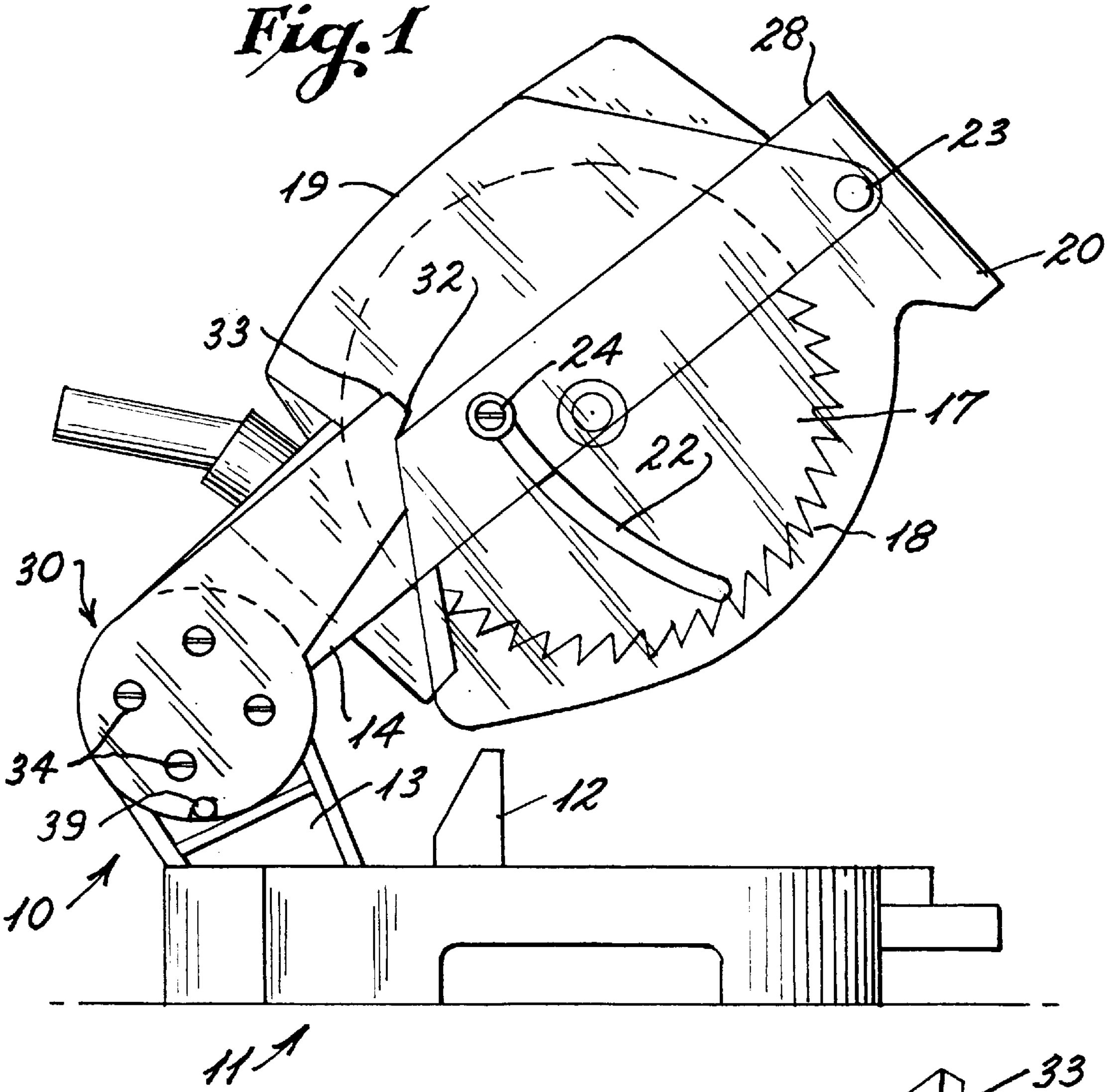
FIG. 1 is a side elevational view of a miter saw shown in a fully raised "home" position, the saw having a movable blade guard and an interference guard stop in accordance with a preferred embodiment of the present invention.
Figure 2:
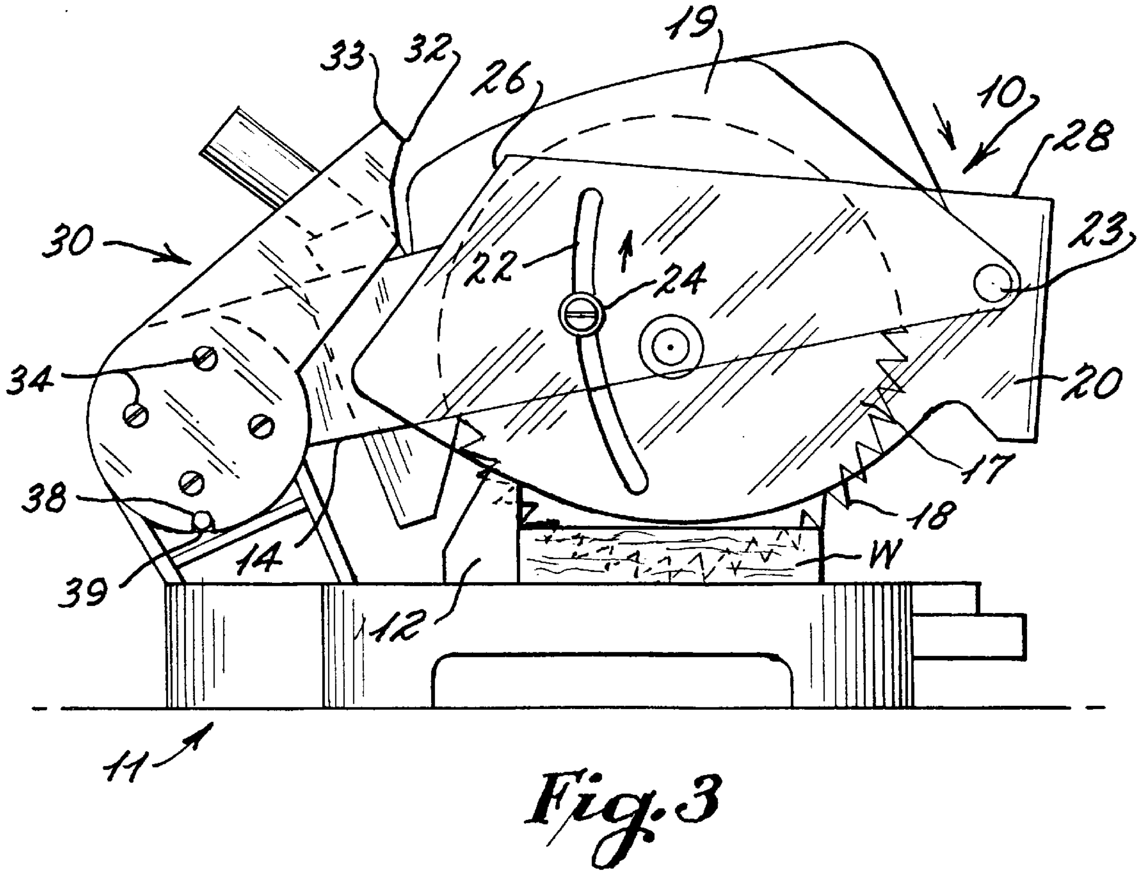
FIG. 2 is a side elevational view of the miter saw of FIG. 1 shown in a "cutting" position for cutting through a workpiece.
Figure 3:
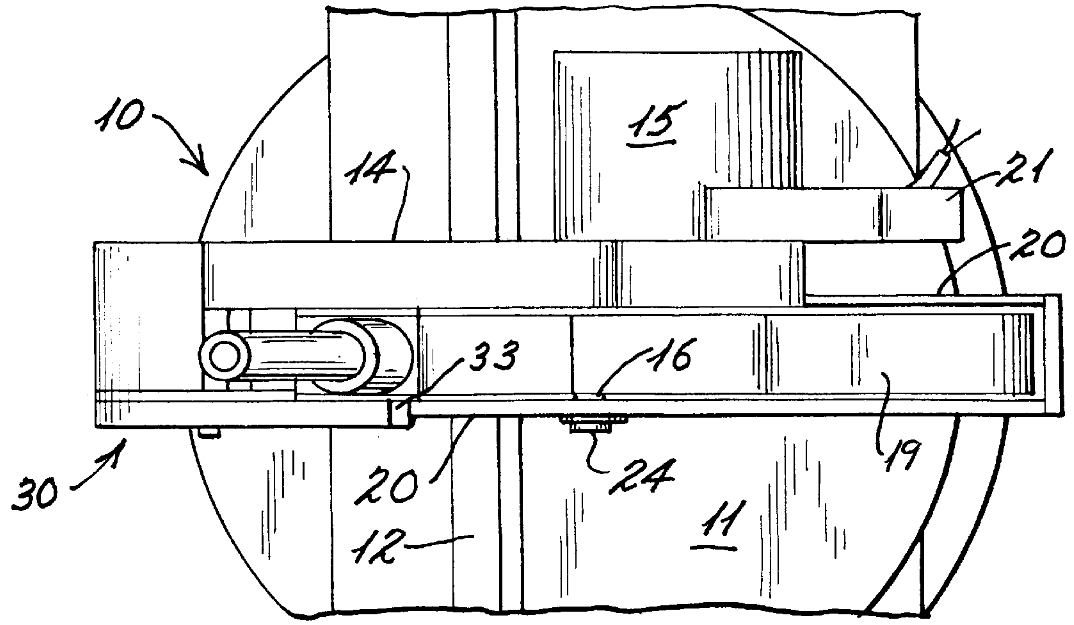
FIG. 3 is a partial top plan view of the miter saw of FIG. 1.

Referring to the drawings, a miter saw shown generally by reference number 10 includes a base 11 on which is mounted a fence 12 against which a workpiece "W" may be selectively positioned, as shown in FIG. 2. A support bracket 13 extends upwardly from the rear portion of the base 11 and a saw support arm 14 is pivotally mounted by a conventional pivot assembly to the upper portion of the support bracket 13. A saw motor 15 and upper blade guard housing 19 are carried by the outer portion of the support arm 14 and are normally retained in a raised or "home" position, as shown in FIG. 1, by the construction of the conventional pivot assembly.

The motor includes a drive shaft 16 to which a saw blade 17 having a cutting edge 18 is mounted. The upper portion of the saw blade is situated within the housing or upper blade guard 19 which extends on opposite sides of the saw blade and is retained in fixed relationship with respect thereto by being secured to the motor housing.

An operator's control handle 21 extends from the motor housing and includes a trigger switch (not shown) which is engageable by an operator to initiate the rotation of the saw blade. The motor is connected by suitable electrical connections to a source of electrical supply (not shown). Conventionally, the motor cannot be activated unless the operator is appropriately grasping the handle 21 and engaging the operating trigger. In use, once the handle is engaged, the motor and saw assembly are lowered toward the workpiece "W" mounted on the base 11, as shown in FIG. 2, after which the motor and saw assembly are pivotally raised with the support arm to the "home" position shown in FIG. 1.

The miter saw 10 has a lower blade guard 20 which is pivotally attached to the upper blade guard housing 19 by a pivot member 23. An arcuate slot 22 is formed in the lower blade guard 20 and cooperates with a guide screw or pin 24 fixed to the upper guard or housing 19 to enable the lower guard 20 to pivot up and down with respect to the fixed upper housing. A spring (not shown), another biasing means, or simply the force of gravity, urges the lower guard 20 downwardly to its lowermost position in covering relationship to the lower cutting edge 18 of the saw blade 17 so that the guard 20 rests on the screw or pin 24 at the highest point within slot 22, as illustrated in FIG. 1. Contact with a workpiece, such as workpiece "W" shown in FIG. 2, pushes the lower guard 20 upwardly with slot 22 sliding upward with respect to the screw or pin 24, until the rotating blade is exposed to cut through the workpiece. After the workpiece is cut and/or when the arm of the saw is raised or retracted, the lower guard 20 falls back down to cover the cutting edge of the saw blade and the screw or pin 24 again rests at the uppermost point in slot 22.

Figure 4:
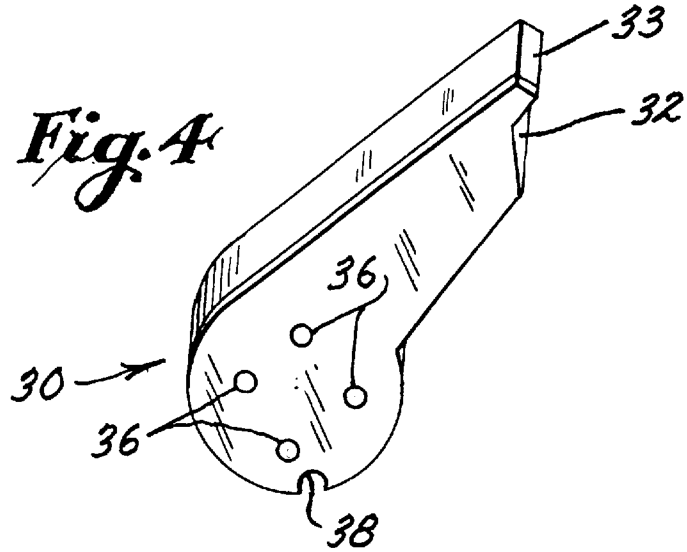
FIG. 4 is a perspective view of the preferred embodiment of the interference stop device of the present invention.

The present invention reduces the possibility of injury to a saw operator by applying to the frame or upper portion of the support bracket or support arm of the saw 10 a specially constructed interference guard stop 30, a preferred embodiment of which is illustrated in detail in FIG. 4. The stop 30 is mounted at a location such that the stop 30 makes contact with the lower blade guard 20 when the saw is in the fully raised "home" position, thereby preventing movement of the lower guard 20 away from the blade 17. The stop 30 should be composed of a material strong enough to provide adequate resistance against the blade guard 20 so as to prevent lower blade guard movement away from the saw blade.

The retractable lower blade guard 20 illustrated includes a tapered flat section 26. The interference stop 30 of the invention includes a saw guard contact face or region 32 which preferably may be shaped to cooperatively engage the tapered flat section 26 of the lower blade guard. As shown, the contact face may be generally concave so that a progressive force is applied against the lower blade guard as the guard and saw blade motor and upper housing are pivoted toward the upper "home" position.

Further, an extension or nose portion 33 extends beyond the contact face so as to engage with the upper edge 28 of the lower blade guard and thereby prevents any possible clockwise movement of the lower blade guard when in the "home" position. The interference stop 30 may be mounted to the base of the saw arm by any suitable fastening means such as four screws 34 screwed through four mounting holes 36, as illustrated in the drawing figures.

The stop 30 can be attached to the saw frame in several alternative locations. However, the contact face 32 of the interference stop 30 should be located at such a position to make stable contact with the lower blade guard 20 as the saw assembly is being returned to the "home" position. In the illustrated embodiment of FIG. 1, this position is designated at the location of the flat tapered section 26 of the lower guard 20 when the saw is moved toward the raised position.

The interference stop 30 may include a recess 38 configured to fit around a conventional pin 39 on the saw arm or support which is used to allow the support arm to be collapsed relative to the base.

The interference stop 30 automatically reduces the potential for accidental injuries occurring to the saw operator while the saw 10 is in or is being raised toward the "home" position. The stop 30 acts as a bumper to prevent the saw guard from moving away from the blade, as the saw guard contact face 32 presses against the flat tapered section 26 of the guard 20. It is not, therefore, possible to push the lower blade guard away from the saw blade and expose the cutting edge when the saw is in or is being raised toward "home" position. The degree of taper of the contact surface of the stop will determine the point in the pivotal movement of the lower blade guard when resistance is applied to prevent the accidental displacement of the lower blade guard.

The interference stop 30 of the present invention has been shown in the drawing figures and described above in the preferred embodiment for use with, and as part of, a miter saw. The present invention is readily adaptable for use in the retrofitting of other existing power saws.

The foregoing description of the preferred embodiments of the invention has been presented to illustrate the principles of the invention and not to limit the invention to the particular embodiments illustrated. The scope of the invention is defined by the embodiments encompassed within the following claims and any and all equivalents thereof.

What is claimed is:

1. In a power saw having a cutting blade mounted to a drive shaft of a motor and wherein an upper portion of the cutting blade is positioned within a housing and wherein the motor, housing and cutting blade are mounted to a support arm pivotally mounted to a support frame, the support arm being pivotable to move the motor, housing and cutting blade between a lower cutting position and a raised position, and wherein the housing includes front and rear portions, the improvement comprising:

a lower blade guard having side walls for extending on opposite sides of the cutting blade below the housing, said lower blade guard including a front portion and a rear portion, means for pivotally mounting said front portion of said lower blade guard to the front portion of the housing so that said lower blade guard pivots downwards to cover a cutting edge of the cutting blade when the cutting blade is moved with said support arm between the raised position and the lower cutting position and so that the lower blade guard pivots upwardly to expose the cutting edge when the lower blade guard contacts a workpiece, a stop member, means for mounting said stop member to said support frame adjacent said support arm, said stop member having an outwardly extending portion including a contact face positioned exteriorly of the housing and adjacent the rear portion thereof, said contact face engaging said rear portion of said lower blade guard only when said support arm is in the raised position to thereby prevent said lower blade guard from pivoting upwardly and away from the cutting edge of the cutting blade when the cutting blade is in the raised position, and said contact face being spaced from said lower blade guard when said support arm is moved from the raised position toward the lower cutting position.

2. The power saw of claim 1 including an arcuate slot in said lower blade guard, pin means extending from the housing and extending through said arcuate slot in said lower blade guard to thereby guide said lower blade guard.

3. The power saw of claim 1 wherein said outwardly extending portion of said stop member includes a projection adapted to engage an upper portion of said lower blade guard when the cutting blade is in the raised position.

4. The power saw of claim 1 in which said contact face of said stop member is concave in configuration.

5. The power saw of claim 4 including an arcuate slot in said lower blade guard, pin means extending from the housing and extending through said arcuate slot in said lower blade guard to thereby guide said lower blade guard.

6. A safety device for a power saw which is mounted to a pivotally support arm and wherein the support arm is secured to a frame member so that the power saw is vertically movable between a raised position relative to a base and lower cutting position relative to the base, the power saw including a blade, a housing which encloses an upper portion of the blade and a lower blade guard which is pivotally mounted to a forward portion of the housing for relative pivotal movement with respect thereto and which covers a cutting edge of the blade, and wherein the lower blade guard pivots downwardly to cover the cutting edge, when the power saw is moved between the raised and lower cutting position and which pivots upwardly to expose the cutting edge when the lower blade guard contacts a workpiece when the power saw is in the lower cutting position, the safety device comprising:

a stop member, means for securing said stop member to the frame member in normally fixed relationship relative to the support arm, said stop member including an outer portion which extends from the support arm toward a rear portion of the lower blade guard, said outer portion of said stop member including a contact face which engages said rear portion of the lower blade guard when the power saw is in the raised position relative to the base to thereby prevent pivotable movement of the lower blade guard away from the cutting edge of the blade and accidentally exposing the cutting edge when the power saw is in the raised position, and said contact face being spaced from said lower blade guard when said support arm is moved from the raised position toward the lower cutting position.

7. The safety device of claim 6 in which said contact face is generally concave.

8. The safety device of claim 7 in which said outer portion of said stop member includes a nose portion extending outwardly beyond said contact face and being adapted to engage an upper edge of the lower blade guard.

* * * * *